March 16, 1965 C. T. COLGREN ETAL 3,173,597
EGG CARTON
Filed May 23, 1963 3 Sheets-Sheet 1

INVENTORS
Carl T. Colgren
and Wendell T. Burbank
By Gordon H. Kuetchen atty.

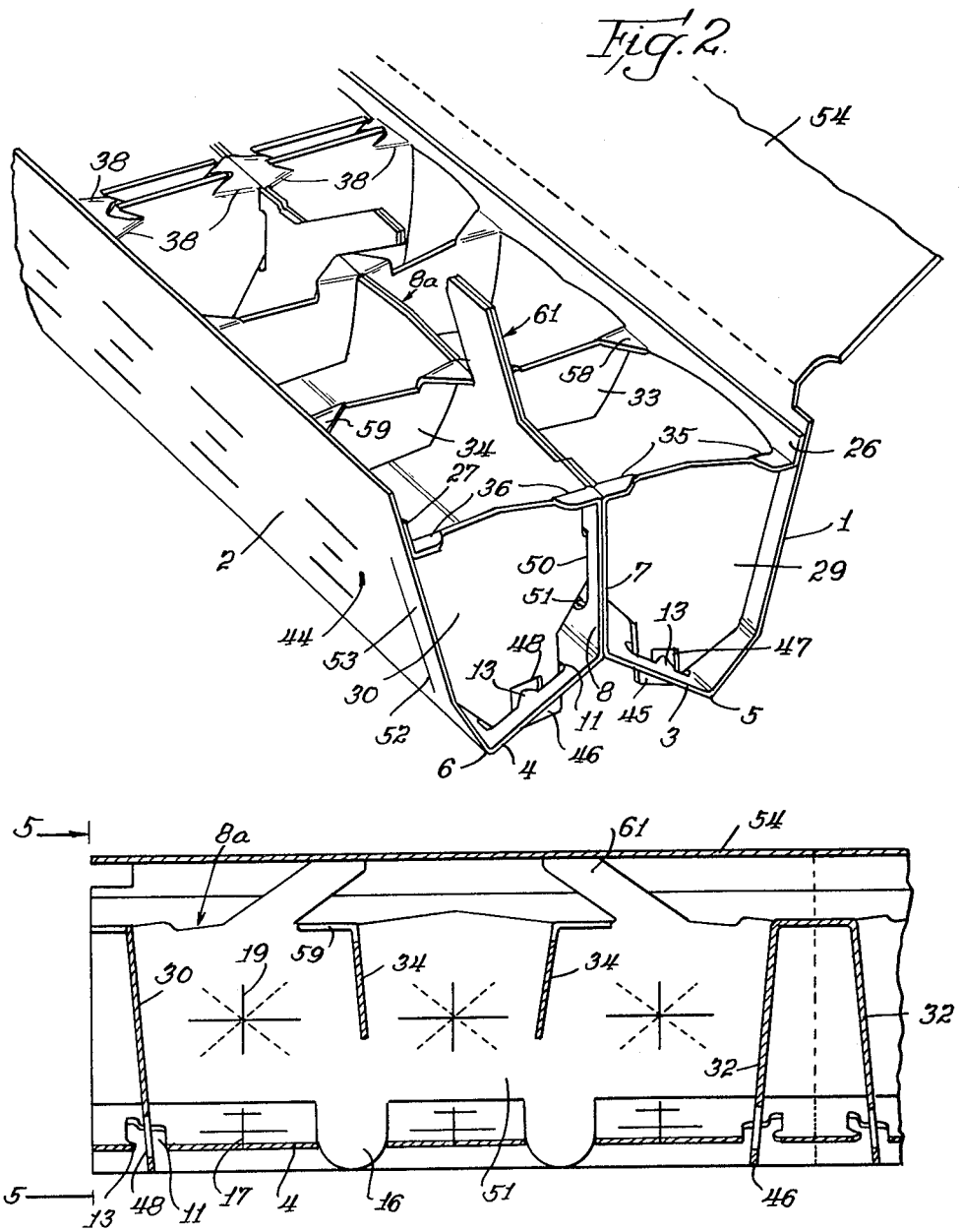

March 16, 1965 C. T. COLGREN ETAL 3,173,597
EGG CARTON
Filed May 23, 1963 3 Sheets-Sheet 3
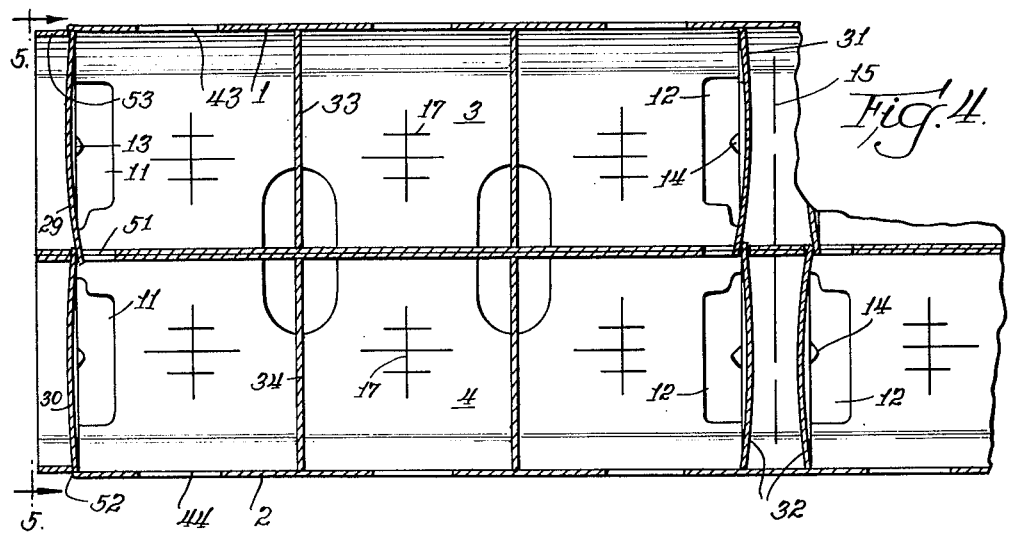
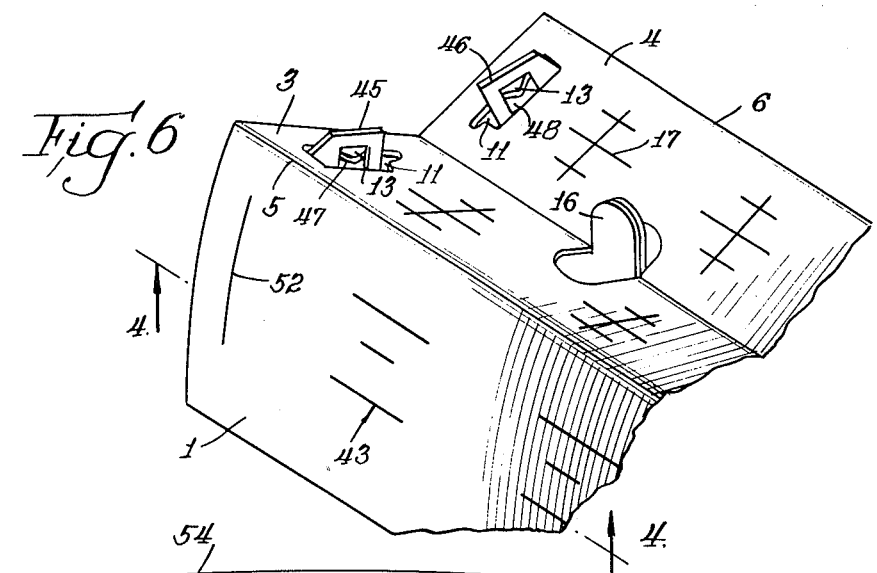
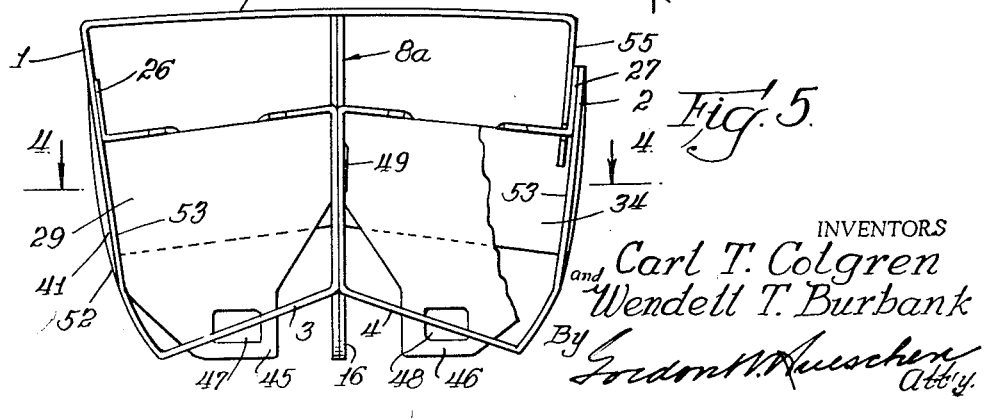
INVENTORS
Carl T. Colgren
and Wendell T. Burbank
By Gordon W. Auescher
Atty.

3,173,597
EGG CARTON
Carl T. Colgren and Wendell T. Burbank, Kalamazoo,
Mich., assignors to KVP Sutherland Paper Company,
Kalamazoo, Mich., a corporation of Delaware
Filed May 23, 1963, Ser. No. 282,772
7 Claims. (Cl. 229—28)

The present invention relates to egg cartons, and is more particularly concerned with a collapsible cellular egg carton having a novel structure particularly designed for the purpose of accommodating large eggs with decreased danger of breakage.

Under the stimuli of vitamins, hormones and antibiotics, chickens are progressively producing larger and larger eggs in complete and utter disregard for the welfare of carton manufacturers. An obvious solution to the problem would of course be to increase the size of the egg cartons. However, certain factors mitigate against the desirability of such a solution. First, there is the added cost of larger cartons. Second, crates and bulk packages in which egg cartons are packed have become universally standardized, and the institution of a larger size carton would require complete renovation of present egg transporting facilities. Moreover, not all eggs are large and, if smaller eggs were to be placed in cartons designed exclusively for large eggs, they would be subject to greatly increased danger of breakage.

It is an object of the present invention to provide an egg carton of standard size but which will accommodate larger eggs. It is another object to provide an egg carton which will accommodate both larger and smaller eggs in the same carton and at the same time. It is a further object to provide a carton which is strong and offers a high degree of protection against breakage for eggs of all sizes. It is still a further object to provide a carton designed for containing a dozen eggs, which carton has means provided for being severed in half, each half being capable of serving as a separate container and offering a high degree of protection even to the eggs adjacent to the severed area. The accomplishment of the foregoing and additional objects will become more fully apparent hereinafter.

The invention in its preferred embodiment is illustrated by the accompanying drawings in which:

FIG. 2 is a fragmentary perspective view showing the carton with the cover open.

FIG. 3 is a fragmentary longitudinal section.

FIG. 4 is a fragmentary horizontal section taken at the line 4—4 of FIGS. 5 and 6.

FIG. 5 is an end view taken at the line 5—5 of FIGS. 3 and 4.

FIG. 6 is an inverted fragmentary perspective view showing an end portion of the bottom of the carton.

Reference is now made to the accompanying drawings for a better understanding of the invention, wherein all the parts are numbered and wherein the same numbers are used to refer to corresponding parts throughout.

Figure 1:
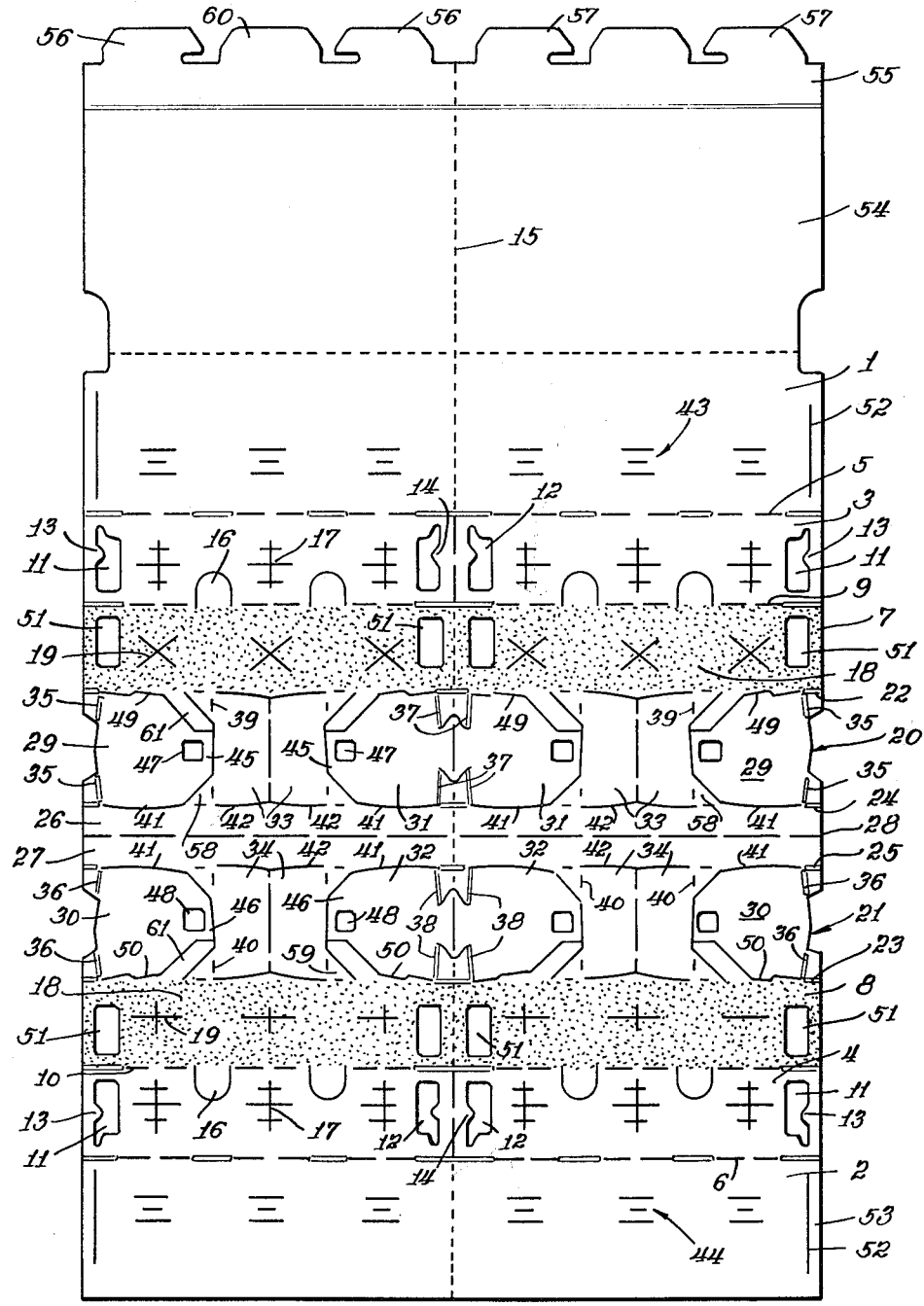
FIG. 1 is a plan view of the blank from which the carton is formed, viewed from the bottom.

In a preferred form, the carton of the invention is constructed from an integral blank as illustrated in FIG. 1. The structure of the carton comprises a rear wall 1 and a front wall 2 which together constitute the side walls of the carton structure. Bottom members 3 and 4 are respectively hingedly connected to rear wall 1 and front wall 2 along score lines 5 and 6. The bottom members 3, 4 are hingedly connected to longitudinal partition members 7, 8 along score lines 9, 10. The bottom members have end slots 11 and central slots 12. The end slots 11 have tongues 13 on their outer edges directed inwardly, and central slots 12 have similar tongues 14 on their inner edges directed outwardly. A transverse separation line 15, which may be provided by perforating or scoring, extends the entire length of the blank, as illustrated in FIG. 1. Vertical legs 16 are formed from each bottom member, to be glued together at the center (See FIGS. 5 and 6). Groups of multiple cross slits 17 are provided in the bottom members intermediate the slots 11, 12 to serve as cushioning elements for each egg, as also seen in FIGS. 4 and 6.

When the carton is assembled, the longitudinal partition members 7, 8 are secured together as by means of glue 18 applied to at least one of the members, as illustrated in FIG. 1, to form a single partition member 8a. The partition member is provided with cross slits 19 to permit larger eggs to extend somewhat into the opposite compartments, which may be occupied by smaller eggs. These cross slits 19 are also seen in FIG. 3.

The top members 20, 21 are hingedly connected at 22, 23 to the upper edges of the longitudinal partition members 7 and 8, and at 24, 25 to sealing strips 26, 27, which are secured as by gluing to the rear wall 1 and front wall 2. The sealing strips are joined in the blank at the fracturing line 28, along which the blank is fractured prior to assembly. The top members 20, 21 are slit and scored to provide vertical end wall members 29, 30 and vertical central partition members 31, 32. The pairs of end wall and partition members 29 and 31, and 30 and 32 swing oppositely when the carton is being erected, and lie oppositely in the blank as shown in FIG. 1. Also cut and scored from the top members 20, 21 are vertical intermediate partition members 33, 34. Each adjacent pair swings oppositely in erecting the carton. The end wall members 29, 30 are hingedly connected to the top members along angled score lines 35, 36 which are so positioned that the end wall members are bowed out longitudinally in the direction of the end of the carton when they are erected in vertical position. The central partition members 31, 32 are hingedly connected to the top members 20, 21 along angled score lines 37, 38 which are so oriented that the central partition members are caused to bow out longitudinally centerwardly in the direction of the transverse separation line 15 which divides the carton into equal halves. The intermediate partition members 33, 34 are hinged to the top members at lines 39, 40. As a consequence of the bowing out of the end wall members and the bowing in of the central partition members, longitudinally enlarged compartments are provided at the ends and in the middle of the carton for storage of larger eggs therein without subjection to undue force or pressure which would be likely to result in their breakage.

The end wall members 29, 30 and partition members 31, 32, 33, and 34 are provided with convexly arcuate outer edges 41, 42 which cause the rear wall 1 and front wall 2 to bow outwardly when the end wall members and partition members are erected in vertical position. This in turn causes a transverse enlargement of each egg compartment. Groups of parallel slits 43, 44 are provided in the front wall and rear wall for the purpose of relieving the stress produced in the walls by the bowing, and also serve to facilitate the bowing operation. Further, the slits aid in cushioning the sides of the individual eggs. The particular configuration of two large slits with a smaller intermediate slit has been found to provide particularly good results in these respects. The optimum length and location of the slits are dependent upon the stiffness of the particular paperboard or other material of the carton construction, and may be readily determined without difficulty.

The end walls 29, 30 and central partition members 31, 32 are provided with tongues 45, 46 which extend through the slots 11, 12 of the bottom members 3, 4. The tongues are provided with slots 47, 48 which in turn engage the tongues 13, 14 of the bottom members, thus preventing the partition members from being pulled out and thereby accidentally discharging the contents of the carton (see FIGS. 4, 5 and 6). The inner edges of the end walls 29, 30 and central partition members 31, 32 are also provided with protuberances 49, 50 which engage slots 51 provided in the longitudinal partition members 7 and 8 which becomes 8a. This arrangement secures the inner edges of the end wall and partition members in erected position. In order to secure the outer edges of the end wall members 29, 30, vertical retention slits 52 are provided in the front wall and rear wall at the ends of the carton. When the carton is placed in erected condition, the vertical strips 53 defined by the vertical retention slit 52 retain their original shape even when the rear wall and front wall bow outwardly. Consequently, the endward edges of the slits serve as detents to retain the arcuate edges of the end wall members 29, 30, preventing endward movement, as can be seen in FIGS. 2 and 5. If desired, vertical retention slits may also be present in the area where the central partition members 31, 32 engage the side walls. When the carton is subsequently severed, these additional vertical retention slits serve to retain the arcuate edges of the central partition members, the partition members now serving as new end walls.

A carton cover 54 is hingedly connected at one edge to the rear wall 1, and its swinging edge is provided with a closure flap 55 connected thereto. In the embodiment illustrated, the closure flap has a pair of facing closure tongues 56, 57 on each side of the separation line 15. Hinge members 58, 59 connect the vertical partition members 33, 34 with the sealing strips 26, 27 and with longitudinal partition member 8a. The closure tongues are beveled to facilitate their engagement with hinge members 59 adjacent forward wall 2. Positioned intermediate the closure tongues are guide tongues 60. The arrangement described, having facing pairs of tongues, permits the carton to be severed along the transverse separation line 15 into two separate and complete halves in each of which central partition members 31, 32 serve as strongly secured end walls. In order to support the central portion of the cover, the top members 20, 21 are cut to provide upwardly projecting support tongues 61, complementary members of which may be glued together to form extensions of the longitudinal partition member 8a, as best seen in FIGS. 2 and 3.

The cartons of the present invention have many advantages over prior art cartons. Because the side walls are maintained in bowed-out condition by the arcuate edges of the end wall members and partition wall members, a larger space is provided in each compartment without placing undue stress on the egg shells. The parallel slits which are located in the side walls further relieve the stress caused by the bowing out of the side walls and also provide cushioning means for the eggs. Increased space is also provided in the end compartments and in the center compartments by causing the end walls and central partition walls to bow longitudinally outward in relation to their respective compartments. The end walls of the carton are greatly strengthened by providing vertical retaining slits in the rear and forward outer walls which cooperate with arcuate edges of the end walls. The central partitions may be strengthened in similar manner.

Positive securing of the inner edges of the end walls is obtained by providing slots in the longitudinal partition member which engage protuberances provided on the inner edges of the end walls and central partitions.

As a result of the present structure, an egg carton is provided which can safely contain large size eggs, and which may be severed in half, each half being capable of containing the eggs therein as safely as in the unsevered carton.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. A carton formed of an integral blank and comprising front and rear side walls, bottom members hingedly connected to the lower edges of said side walls, longitudinal partition members hingedly connected to the inner edges of said bottom members and adhesively secured to each other in side-by-side relationship, top members hingedly connected to the upper edges of said longitudinal partition members and adhesively affixed to the inner sides of said side walls, said top members constituting cross members connecting the upper portions of said side walls with said longitudinal partition members, said top members being slitted and scored to provide vertical end wall members, vertical central partition members, and vertical intermediate partition members hingedly connected thereto, said end wall members and partition members being provided with convexly arcuate outer edges so arranged that when said members are placed in erected position said front and rear side walls are caused to be bowed out, the inner edges of said end wall members and said central partition members being provided with a protuberance and said longitudinal partition member being provided with slots positioned to be engaged by said protuberances, whereby the inner edges of said members are secured in erected position, and a cover hingedly connected to the upper edge of said rear side wall and provided with means at its swinging edge for being secured in closed position.

2. A carton formed of an integral blank and comprising front and rear side walls, bottom members hingedly connected to the lower edges of said side walls, longitudinal partition members hingedly connected to the inner edges of said bottom members and adhesively secured to each other in side-by-side relationship, top members hingedly connected to the upper edges of said longitudinal partition members and adhesively affixed to the inner sides of said side walls, said top members constituting cross members connecting the upper portions of said side walls with said longitudinal partition members, said top members being slitted and scored to provide vertical end wall members, vertical central partition members, and vertical intermediate partition members hingedly connected thereto, said end wall members and partition members being provided with convexly arcuate outer edges so arranged that when said members are placed in erected position said front and rear side walls are caused to be bowed out, said front and rear side walls being provided near each end with vertical retention slits positioned along the line of engagement with the arcuate edges of said end wall members, whereby the endward edges of said slits retain said arcuate edges and prevent them from moving endwardly, each of the inner edges of said end wall members and said central partition members being provided with a protuberance and said longitudinal partition member being provided with slots positioned to be engaged by said protuberances, whereby said members are secured in erected position; and a cover hingedly connected to the upper edge of said rear side wall and provided with means at its swinging edge for being secured in closed position.

3. A carton formed of an integral blank and comprising front and rear side walls, bottom members hingedly connected to the lower edges of said side walls, longitudinal partition members hingedly connected to the inner edges of said bottom members and adhesively secured to each other in side-by-side relationship, top members hingedly connected to the upper edges of said longitudinal partition members and adhesively affixed to the inner sides of said side walls, said top members constituting cross members connecting the upper portions of said side walls with said longitudinal partition members, said top members being slitted and scored to provide vertical end wall members, vertical central partition members, and vertical intermediate partition members hingedly connected thereto, said end wall members and partition members being provided with convexly arcuate outer edges so arranged that when said members are placed in erected position said front and rear side walls are caused to be bowed out, said front and rear side walls being provided with a plurality of groups of horizontally oriented parallel slits, each of the inner edges of said end wall members and said central partition members being provided with a protuberance and said longitudinal partition member being provided with slots positioned to be engaged by said protuberances, whereby said members are secured in erected position, and a cover hingedly connected to the upper edge of said rear side wall and provided with means at its swinging edge for being secured in closed position.

4. A carton formed of an integral blank and comprising front and rear side walls, bottom members hingedly connected to the lower edges of said side walls, longitudinal partition members hingedly connected to the inner edges of said bottom members and adhesively secured to each other in side-by-side relationship, top members hingedly connected to the upper edges of said longitudinal partition members and adhesively affixed to the inner sides of said side walls, said top members constituting cross members connecting the upper portions of said side walls with said longitudinal partition members, said top members being slitted and scored to provide vertical end wall members, vertical central partition members, and vertical intermediate partition members hingedly connected thereto, said end wall members and partition members being provided with convexly arcuate outer edges so arranged that when said members are placed in erected position said front and rear side walls are caused to be bowed out transversely, said front and rear side walls being provided with a plurality of groups of horizontally oriented parallel slits, said end wall members and said central partition members being hingedly connected to said top members along angled score lines so oriented that said end wall members are caused to be bowed out longitudinally endwardly and said central partition members are caused to be bowed out longitudinally centerwardly, thereby increasing the size of the respective compartments defined by said members, each of the inner edges of said end wall members and said central partition members being provided with a protuberance and said longitudinal partition member being provided with slots positioned to be engaged by said protuberances, whereby said members are secured in erected position, and a cover hingedly connected to the upper edge of said rear side wall and provided with means at its swinging edge for being secured in closed position.

5. A carton formed of an integral blank and comprising front and rear side walls, bottom members hingedly connected to the lower edges of said side walls, longitudinal partition members hingedly connected to the inner edges of said bottom members and adhesively secured to each other in side-by-side relationship, top members hingedly connected to the upper edges of said longitudinal partition members and adhesively affixed to the inner sides of said side walls, said top members constituting cross members connecting the upper portions of said side walls with said longitudinal partition members, said top members being slitted and scored to provide vertical end wall members, vertical central partition members, and vertical intermediate partition members hingedly connected thereto, said end wall members and partition members being provided with convexly arcuate outer edges so arranged that when said members are placed in erected position said front and rear side walls are caused to be bowed out, said front and rear side walls being provided with a plurality of groups of horizontally oriented parallel slits, and being provided near each end with vertical retention slits positioned along the line of engagement with the arcuate edges of said end wall members, whereby the endward edges of said slits retain said arcuate edges and prevent them from moving endwardly, each of the inner edges of said end wall members and said central partition members being provided with a protuberance and said longitudinal partition member being provided with slots positioned to be engaged by said protuberances, whereby said members are secured in erected position, and a cover hingedly connected to the upper edge of said rear side wall and provided with means at its swinging edge for being secured in closed position.

6. A carton formed of an integral blank and comprising front and rear side walls, bottom members hingedly connected to the lower edges of said side walls, longitudinal partition members hingedly connected to the inner edges of said bottom members and adhesively secured to each other in side-by-side relationship, top members hingedly connected to the upper edges of said longitudinal partition members and adhesively affixed to the inner sides of said side walls, said top members constituting cross members connecting the upper portions of said side walls with said longitudinal partition members, said top members being slitted and scored to provide vertical end wall members, vertical central partition members, and vertical intermediate partition members hingedly connected thereto, said end wall members and partition members being provided with convexly arcuate outer edges so arranged that when said members are placed in erected position said front and rear side walls are caused to be bowed transversely out, said front and rear side walls being provided with a plurality of groups of horizontally oriented parallel slits, and being provided near each end with vertical retention slits positioned along the line of engagement with the arcuate edges of said end wall members, whereby the endward edges of said slits retain said arcuate edges and prevent them from moving endwardly, said end wall members and said central partition members being hingedly connected to said top members along angled score lines so oriented that said end wall members are caused to be bowed out longitudinally endwardly and said central partition members are caused to be bowed out longitudinally centerwardly, thereby increasing the size of the respective compartments defined by said members, each of the inner edges of said end wall members and said central partition members being provided with a protuberance and said longitudinal partition member being provided with slots positioned to be engaged by said protuberances, whereby said members are secured in erected position, and a cover hingedly connected to the upper edge of said rear side wall and provided with means at its swinging edge for being secured in closed position.

7. A carton comprising front and rear side walls, bottom members hingedly connected to the lower edges of said side walls, longitudinal partition members hingedly connected to the inner edges of said bottom members and adhesively secured to each other in side-by-side relationship, top members hingedly connected to the upper edges of said longitudinal partition members and adhesively affixed to the inner sides of said side walls, said top members constituting cross members connecting the upper portions of said side walls with said longitudinal partition members, said top members being slitted and scored to provide vertical end wall members, vertical central partition members, and vertical intermediate partition members hingedly connected thereto, each of the inner edges of said vertical end wall members and said vertical central partition members being provided with a protuberance and said longitudinal partition member being provided with slots positioned to be engaged by said protuberances, whereby said members are secured in erected position, and a cover hingedly connected to the upper edge of said rear side wall and provided with means at its swinging edge for being secured in closed position.

References Cited by the Examiner

UNITED STATES PATENTS

| | | | |
|---|---|---|---|
| 2,326,244 | 8/43 | Moore | 229—29 |
| 2,645,402 | 7/53 | Buttery | 229—28 |
| 2,933,231 | 4/60 | Colgren et al. | 229—28 |

FOREIGN PATENTS 740,948　11/55　Great Britain.

FRANKLIN T. GARRETT, *Primary Examiner*.